UNITED STATES PATENT OFFICE.

JAMES W. CHASE, OF BUFFALO, NEW YORK.

WALL-PLASTER.

No. 812,978. Specification of Letters Patent. Patented Feb. 20, 1906.

Application filed May 26, 1905. Serial No. 262,480.

*To all whom it may concern:*

Be it known that I, JAMES W. CHASE, a citizen of the United States, residing at Buffalo, in the county of Erie and State of New York, have invented certain new and useful Improvements in Wall-Plaster; and I do hereby declare the following to be a full, clear, and exact description of the invention, such as will enable others skilled in the art to which it appertains to make and use the same.

My invention relates to improvements in wall-plaster, its object being to produce a coating material for walls which can be quickly and easily applied, which will form a smooth and even surface, which will harden rapidly and permanently, and which will not disintegrate under the action of moisture.

The ingredients which enter into my improved plaster and their proportions are as follows: calcined gypsum, two and one-half barrels; Portland cement, one and one-half barrels; acetic acid, five gallons; sand, finely sifted, one cubic yard.

The above quantities when thoroughly mixed will make about two and one-half tons of the finished plaster ready for use.

A binder composed of finely-divided fiber prepared from the roots of the palmetto-tree is thoroughly mixed with the above-described material, the proportion used to be governed by circumstances, and possesses an important and valuable function other than that of binding the particles together. The palmetto-root contains a powerful tannic acid which is liberated in the mixture by the action of the acetic acid and has the important property of chemically hardening and setting the different elements to form an extremely-durable plaster. It thus has the double function of binding the particles together mechanically and causing them to have an increased chemical affinity as well.

My improved plaster has a fine texture owing to the materials used and is susceptible of a very smooth and even surface. It is also impervious to moisture, which prevents its disintegration.

The function of the acetic acid is to retard the hardening or setting of the mixture until it has been applied to the wall and also to cause a more complete union of the materials, thereby producing a perfectly homogeneous mass.

I claim—

A wall-plaster composed of the following ingredients, viz: calcined gypsum, Portland cement, acetic acid, sand and palmetto-root fiber, in the proportions specified.

In testimony whereof I have signed my name to this specification in the presence of two subscribing witnesses.

JAMES W. CHASE.

Witnesses:
W. T. MILLER,
GEO. H. FISHER.